United States Patent [19]
Appleby et al.

[11] 4,081,017
[45] Mar. 28, 1978

[54] APPARATUS FOR GROOVING TIRES

[75] Inventors: Paul E. Appleby, Cuyahoga Falls; Max D. Brinkley, North Canton; Clement C. Smith, Akron, all of Ohio

[73] Assignee: The Goodyear Tire & Rubber Company, Akron, Ohio

[21] Appl. No.: 727,079

[22] Filed: Sep. 27, 1976

[51] Int. Cl.² .......................................... B29H 21/08
[52] U.S. Cl. ..................................................... 157/13
[58] Field of Search ........................................ 157/13

[56] References Cited

U.S. PATENT DOCUMENTS

| | | | |
|---|---|---|---|
| 2,972,376 | 2/1961 | Garmon | 157/13 |
| 3,044,536 | 7/1962 | Brown | 157/13 |
| 3,502,131 | 3/1970 | Rawls | 157/13 |
| 3,623,531 | 11/1971 | Christe et al. | 157/13 |
| 3,999,589 | 12/1976 | Meacheam | 157/13 |

Primary Examiner—James L. Jones, Jr.
Assistant Examiner—James G. Smith
Attorney, Agent, or Firm—F. W. Brunner; Frederick L. Lacher; R. S. Washburn

[57] ABSTRACT

A machine used in the renewal of large earthmover type tires, wherein the worn lugs are completely removed from the tire casing and replaced with convolutions of unvulcanized rubber material. The machine is provided with a heated knife blade which is utilized to cut a series of grooves in the unvulcanized rubber material of the tread in accordance with a pattern mounted on the machine. The pattern consists of a cam with a curved outer periphery which is monitored as the cam rotates on the machine. The depth to which the knife cuts into the unvulcanized rubber material as it moves transversely across the tread, is varied in accordance with the periphery of the cam being monitored.

11 Claims, 3 Drawing Figures

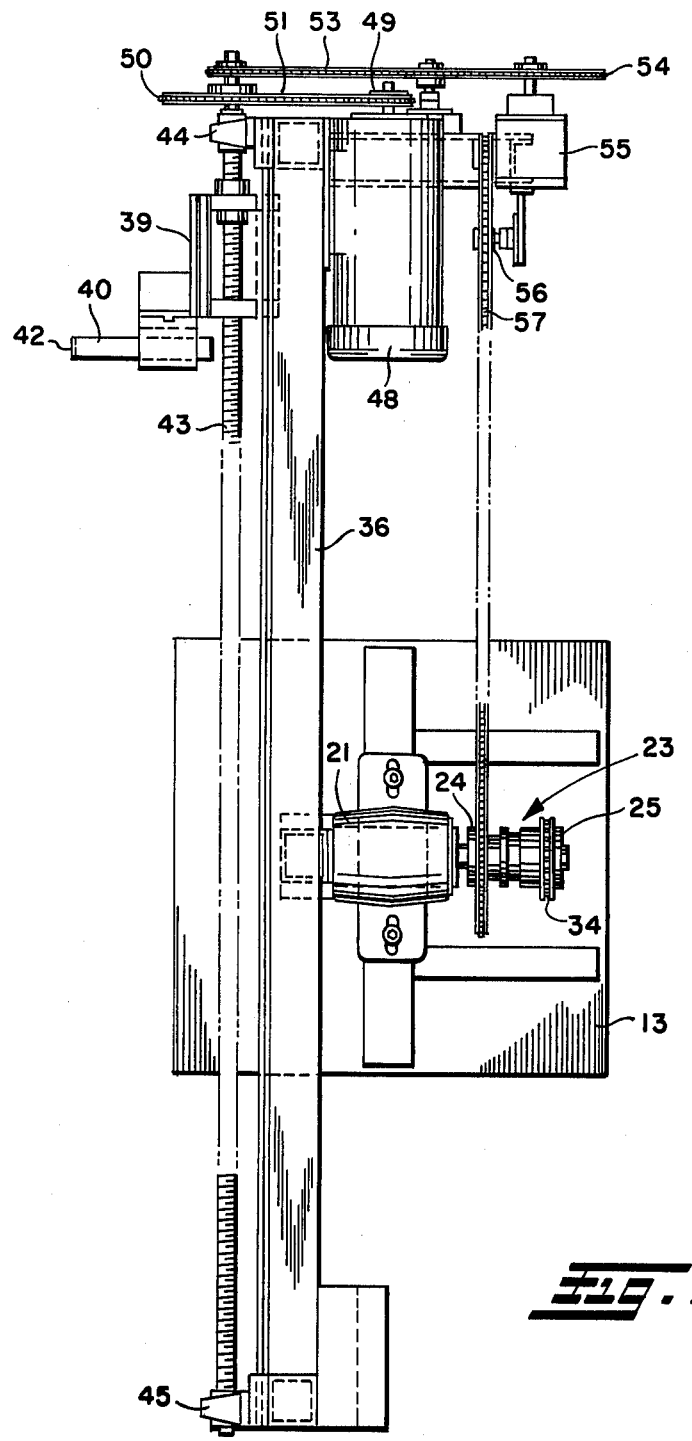

APPARATUS FOR GROOVING TIRES

BACKGROUND OF THE INVENTION

The invention is particularly useful in the renewal of large earthmover-type tires by a method wherein the worn lugs and undertread are buffed from the tire casing. U.S. Pat. No. 3,472,714 describes how convolutions of unvulcanized rubber material are then placed around the outer buffed periphery of the tire casing after the lugs and undertread have been removed. Hand-held grooving tools are generally used to form a pattern of grooves in the laminated or spirally wound unvulcanized tread. However, such an operation is time-consuming and costly. Moreover, the appearance of the grooves is dependent on the steadiness with which the operator handles the grooving tool. The invention is directed to providing a machine for automatically cutting grooves into an unvulcanized tread formed on the buffed tire casing.

Briefly stated, the invention is in a machine for grooving the tread of a tire. The machine has a heatable knife for grooving the tread, as well as means for guiding and moving the knife transversely of the tread at a predetermined desired speed. A groove pattern in the form of a cam, having an outer periphery with a desired curvature, is mounted for synchronous rotation with movement of the knife, the rotational speed of the cam being correlated to the speed at which the knife moves transversely of the tread. Means are provided for monitoring the outer curved periphery of the cam and causing correlated movement of the knife guiding means to and from the tread to vary the depth of cut of the knife in accordance with the curvature of the cam being monitored.

DESCRIPTION OF THE DRAWING

The following description of the invention will be better understood by having reference to the annexed drawing, wherein:

FIG. 3 is a plan view of the mechanism for driving the cutting knife and pattern to which a groove is cut.

DETAILED DESCRIPTION OF THE DRAWING

Figure 1:
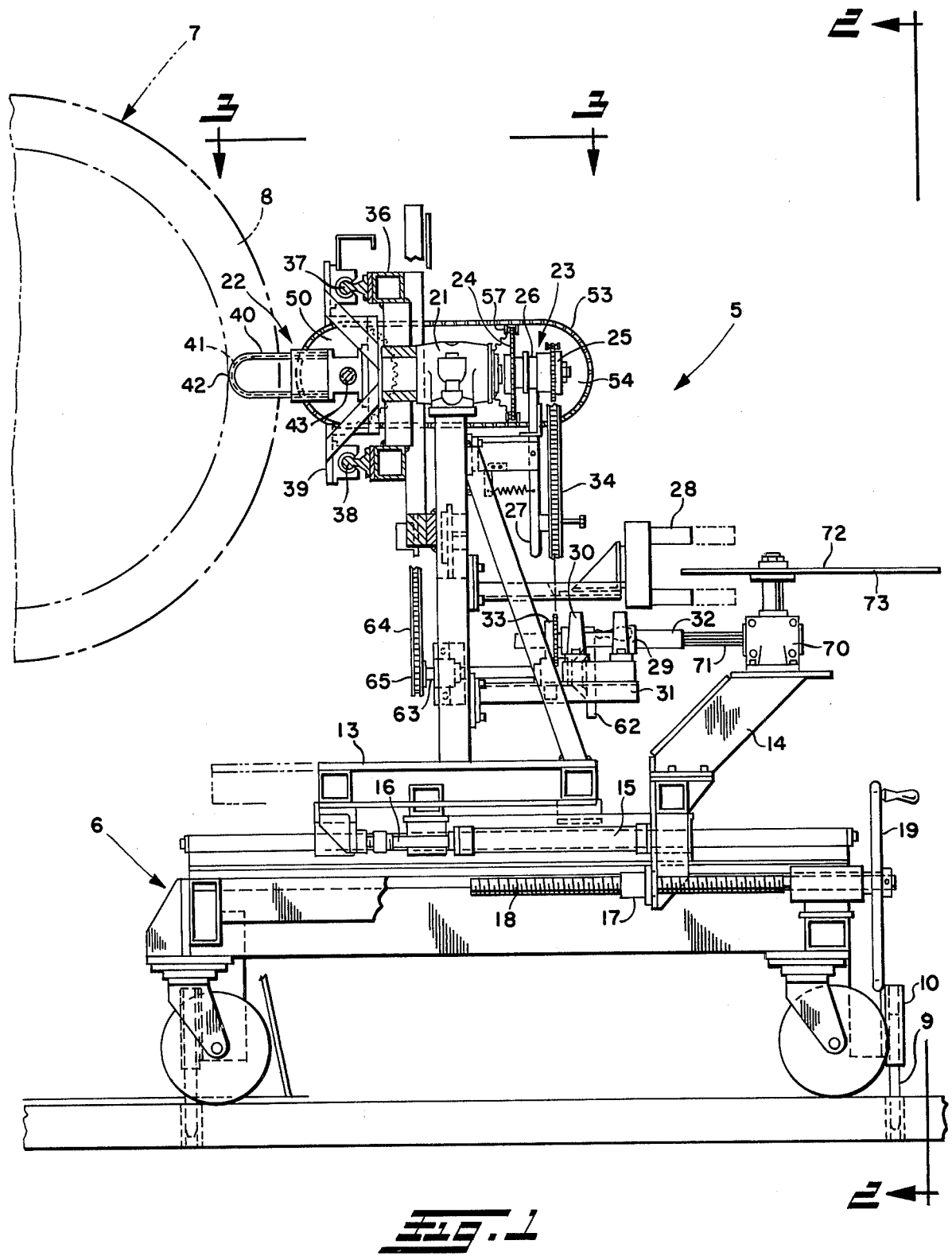
FIG. 1 is a side view of a tire grooving machine made in accordance with the invention.
Figure 2:
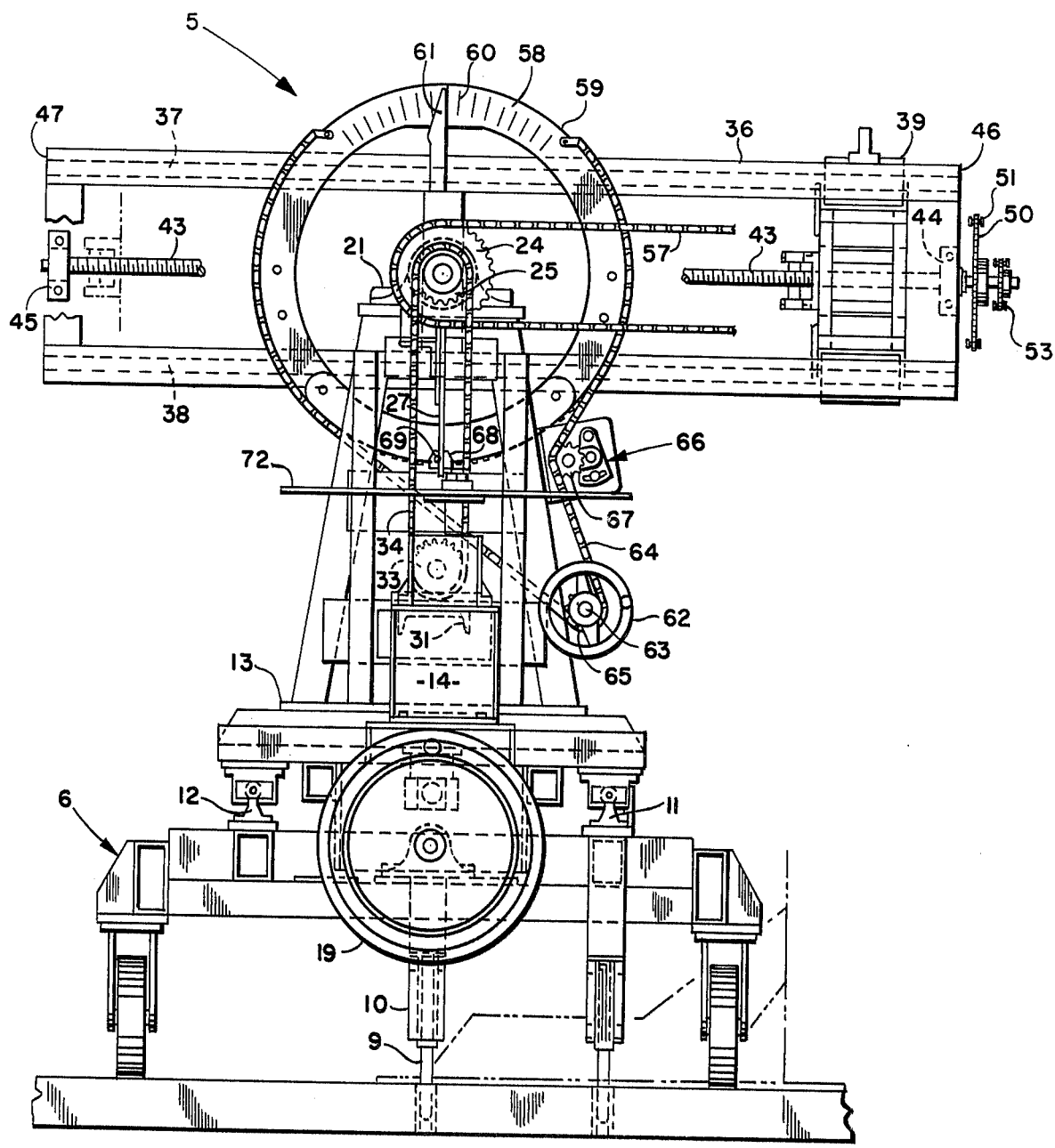
FIG. 2 is the machine viewed from the line 2—2 of FIG. 1.

With reference to FIGS. 1 and 2, there is shown a machine 5 for grooving treads which can be composed of vulcanized or unvulcanized rubber material. The machine 5 comprises a rigid main frame 6 which serves as a supporting surface and is mounted on a number of swivel casters, so that the machine 5 can be easily moved between conventionally designed stationary stands which rotatably support large earthmover-type tires 7 whose worn lugs and undertread have been removed and replaced with new treads 8 formed, for example, of convolutions of unvulcanized rubber material. The main frame 6 carries a number of similar locating pins 9, each of which is housed in a bracket 10 that is secured to the main frame 6, adjacent the swivel casters. The pins 9 are dropped into slots formed in the floor of a factory building adjacent the stationary stands on which large earthmover tires 7 are mounted, to firmly anchor the machine 5 adjacent the unvulcanized treads 8.

A pair of guide rails 11,12 are secured in parallel relation atop the main frame 6. A large primary frame 13 and smaller secondary frame 14 are slidably mounted, in tandem, on the guide rails 11,12. The primary and secondary frames 13,14 are coupled together for unitary or relative movement by a hydraulic cylinder 15 and reciprocating piston 16. The secondary frame 14 carries an adapter 17 for threadably receiving a drive screw 18 which is rotatably mounted on the main frame 6. A hand wheel 19, fastened to the drive screw 18, is used by an operator to rotate the drive screw 18 and move the secondary frame 14 and attached primary frame 13 along the guide rails 11,12.

PRIMARY FRAME

The primary frame 13 includes an upstanding bracket arm 20 on which is mounted a main bearing 21 for rotatably supporting a cutting knife assembly 22. A transfer drive assembly 23, including a pair of sprocket wheels 24,25 of different diameters and a clutching mechanism 26, is rotatably mounted on the bearing 21 opposite the cutting knife assembly 22. A spring-biased lever 27 is provided for engaging and disengaging the clutch mechanism 26, whereby the sprocket wheels 24,25 can be driven, in unison, or the rotation of the smaller sprocket wheel 25 stopped while allowing continued operation of the larger sprocket wheel 24. A sensor 28, such as a photoelectric cell, or conventional directional control valve, is mounted on the upstanding bracket arm 20 of the primary frame 13. A pair of pillow blocks or bearings 29,30 are secured in spaced relation on a platform 31 which extends from the upstanding bracket arm 20 of the primary frame 13. An internally splined shaft 32 is journalled for rotation in the bearings 29,30. A sprocket wheel 33 is keyed to the internally splined shaft 32 in aligned relation with the smaller sprocket wheel 25 of the transfer drive assembly 23. A continuous drive chain 34 is looped around the aligned sprocket wheels 25,33.

CUTTING KNIFE ASSEMBLY

The cutting knife assembly 22 comprises an elongated, rigid beam 36 which is rotatably mounted on the main bearing 21. A pair of guide rods 37,38 are secured longitudinally of the beam 36 in parallel relation.

A carriage 39 is slidably mounted on the guide rods 37,38. A U-shaped knife blade 40, composed of electrically conductive material, e.g. metal, is detachably mounted on the carriage 39 and extends therefrom for engaging the adjacent unvulcanized tread 8 of the earthmover tire 7. The metal knife blade 40 is electrically heated by electricity from any convenient source of supply (not shown). A mechanism 41 is embedded in the knife blade 40 for sensing the temperature of the tip 42 of the knife blade 40. The temperature sensing mechanism 41 regulates the supply of electrical energy to the knife blade 40, thereby controlling the temperature of the knife blade 40. The carriage 39 is coupled to a threaded drive screw 43 which is journalled for rotation in a pair of spaced bearings 44,45 (FIG. 3) located at opposing ends 46,47 of the beam 36. An electric motor 48 is operatively connected to the drive screw 43 by means of differently sized sprocket wheels 49,50 and connecting drive chain 51. The electric motor 48 is operated to rotate the drive screw 43 and move the carriage 39 along the guide rods 37,38. The drive screw 43, as best seen in FIG. 3, is also coupled by a drive chain 53 to the sprocket wheel 54 of a conventional right-angle gear box 55 mounted on the beam 36. A small sprocket wheel 56 of the gear box 55, is coupled by a drive chain 57 to the large sprocket wheel 24 of the transfer drive assembly 23.

A large ring 58 having an outer periphery 59 with projecting gear teeth, is secured to the beam 36. The upper portion 60 of the ring 58 is provided with a scale which is calibrated in degrees. A pointer 61 vertically extends from the upstanding bracket arm 20 of the primary frame 13 for coaction with the scale to indicate the arcuate position of the beam 36. The beam 36 and attached ring 58 are rotated by a hand-operated wheel 62 that is secured to a shaft 63 which is journalled for rotation in a pair of bearings secured to the upstanding bracket arm 20 of the primary frame 13. The wheel 62 is coupled to the ring 58 by means of a drive chain 64 which is reeved around the outer toothed periphery 59 of the ring 58 and a sprocket wheel 65 (FIG. 1) which is keyed to the shaft 63 of the hand-wheel 62. Any suitable belt tensioning device 66, such as an adjustable roller 67, can be utilized to maintain proper tension in the drive chain 64. A locking mechanism in the form of a bracket 68 and set screw 69, are provided to lock the ring 58 firmly in position after the hand-wheel 62 has been utilized to rotate the beam to the desired angular position.

SECONDARY FRAME

A conventional speed reducer 70 is mounted atop the secondary frame 14. An externally splined shaft 71 extends from the speed reducer 70 for interlocking engagement within the internally splined shaft 32 which is rotated by the drive chain 34 extending from the smaller sprocket wheel 25 of the transfer drive assembly 23.

A groove pattern in the form of a cam 72 with a specially configured outer periphery 73, is rotatably mounted on the speed reducer 70. The cam 72 is rotated by the speed reducer 70 in a plane which is normal to the plane in which the beam 36 rotates. The sensor 28 carried by the primary frame 13 is positioned to monitor the outer curved periphery 73 of the cam 72 and actuate operation of the hydraulic cylinder 15 which is coupled between the primary and secondary frames 13,14. In this way, the depth of the groove being cut in the unvulcanized tread 8 of the earthmover tire 7, is controlled. That is, the curved bottom of the groove being cut will correspond to the curvature of the outer periphery 73 of the cam 72 being monitored by the sensor 28. Differently shaped cams can be provided for automatically varying the depth of different grooves cut in the unvulcanized tread 8 by the heated knife 40.

OPERATION OF THE MACHINE

The tire groover or machine 5 is anchored adjacent an earthmover tire 7 which is rotatably mounted on a stationary stand, the tire having been previously buffed to remove the worn lugs and at least a portion of the undertread, after which convolutions of unvulcanized rubber are built up on the buffed periphery of the tire casing to the desired tread thickness. The fixed stand on which the tire 7 is rotatably supported, is designed so that the tire can be indexed to different arcuate positions, or rotated slowly when it is desired to cut circumferential grooves in the unvulcanized rubber of the tread.

Assuming that the cutting knife 40 is in its rest position closest the electric motor 48 and to one side of the tire 7, the electric motor 48 is operated to bring the cutting knife 40 close to the adjacent side of the unvulcanized rubber tread 8. The hand wheel 19 is then rotated, by hand, to move the primary and secondary frames 13 and 14 along the guide rails 11 and 12 until the cutting knife 40 is in position for making the depth of cut or groove desired. The lever 27 is next moved to disengage the clutch mechanism 26 so that the cam 72 can be properly positioned. The hand wheel 19 and hydraulic cylinder 15 can be alternately operated to bring the photo-electric sensor 28 into position for monitoring the curved periphery or edge 73 of the cam 72, while maintaining the cutting knife 40 in proper position adjacent the unvulcanized tread 8 of the tire 7. The cutting knife 40 is electrically heated to the desired temperature, after which the electric motor 48 is reactuated to begin operation of the machine 5. The electric motor 48 simultaneously operates the drive screw 43 for moving the carriage 39 and attached cutting knife 40 transversely of the tread 8, and rotates the cam or groove pattern 72. As the curvature 73 of the cam 72 changes, the photo-electric cell 28 monitoring the curvature, reacts to actuate operation of the hydraulic cylinder 15 to move the primary frame 13 accordingly to and from the tire 7, thereby varying the depth of cut of the knife 40 in accordance with the curvature 73 of the cam 72 being monitored. The cam 72 will cause the knife 40 to completely traverse the tread 8 of the tire 7 in cases where it is desired that the lug extend across the tread. The cam 72 can cause the knife 40 to retract from the tread 8 at about the centerline of the tread 8 in cases where the grooves extend from opposite sides of the tread to about the centerline of the tread. After the cut is completed, the knife 40 is returned to its rest position, and the tire 7 rotated or indexed to a new arcuate position for receiving another groove of the pattern. Upon completion of the grooving process, the locating pins 9 are retracted from the slots into their respective housings or brackets 10, so that the machine 5 can be moved to a new location for grooving another tire mounted on a different stand. As previously indicated, the angle at which the knife 40 moves across the unvulcanized tread 8 can be varied by rotating the hand wheel 62 which controls rotation of the beam 36 to different arcuate positions.

Thus, there has been described a machine for automatically grooving a tire in accordance with a desired pattern. A number of similar cuts can be precisely executed without variance from the desired pattern, which is usually not the case when hand-held grooving tools are used in the formation of the grooves of the tread pattern. The heated grooving knife can be utilized to contour the sides or shoulders of the unvulcanized tread. Moreover, special knives can be adapted to the machine for contouring not only the sides of the unvulcanized tread, but also the outer periphery of the tread, prior to the grooving operation.

The unvulcanized tread, as previously indicated, is built up or laminated, (I) by separately positioning a number of individual convolutions or laminates concentrically around the buffed periphery of the tire casing so that the opposite ends of each laminate are joined in abutting relation, rather than being overlapped, and the joints of adjacent laminates are arcuately staggered, or (II) by spirally wrapping a continuous strip of unvulcanized tread material around the tire casing until the desired tread thickness is achieved, or (III) by a combination of these two methods, i.e. by spirally wrapping a strip of unvulcanized tread material only two or three turns around the tire casing and then stitching down the two or three laminates, after which another strip of unvulcanized tread material is coiled around the convolutions or laminates previously positioned on the tire casing. The act of coiling only a few laminates at a time around the casing is repeated until the desired tread thickness is achieved.

The rubber material of the tread is normally uniform throughout the thickness of the tread, and can be heated or cold when applied to the tire casing. Conventional cushion gum-type rubber material is sometimes used initially around the buffed periphery of the tire casing to cover fabric exposed during the buffing operation, or fill any low spots, or cavities made in repairing defects in the periphery of the tire casing. Moreover, conventional liquid rubber cements can be applied to the buffed periphery of the tire casing, or used between laminates to enhance the bond between them and the tire casing.

A portion of the rubber material adjacent the buffed periphery of the tire casing, e.g. the first convolution positioned around the tire casing, is left unsevered during the grooving of the unvulcanized tread to maintain or re-establish a conventional undertread between the tire casing and pattern of grooves in the tread. The formation of the tread pattern is preferably performed on the unvulcanized tread because of the convenience in reusing the unvulcanized waste or scrap rubber material removed from the grooves upon completion of the grooving operation. The pattern of grooves may be cut in the tread after it has been vulcanized, but it is more difficult to recycle the scrap rubber for reuse in the formation of subsequent unvulcanized treads. This is especially true in cases where surplus rubber is removed, for example, by a circular knife, to shape the tread to a specific contour.

I claim:

1. A machine used for grooving a tread of a tire, comprising:
   (a) a main frame for supporting other components of the machine;
   (b) a primary frame slidably mounted on the main frame;
   (c) a secondary frame slidably mounted on the main frame in spaced relation from the primary frame;
   (d) means coupling the primary and secondary frames together for unitary movement and for movement relative to each other on the main frame;
   (e) a cam rotatably mounted on the secondary frame, the cam having a curved outer periphery corresponding to the transverse curvature of the bottom of the groove desired to be cut in the tread of a tire;
   (f) means, mounted on the primary frame, for monitoring the curved outer periphery of the cam as the cam rotates, said means including a sensor disposed adjacent the cam;
   (g) a heatable knife, associated with the primary frame, for grooving the tread of a tire;
   (h) means, coacting with the knife, for guiding the knife transversely of the tread of a tire positioned adjacent the machine;
   (i) means, coacting with the primary frame, for mounting the knife guiding means for rotation in a plane which is normal to the direction in which the knife guiding means moves to and from a tire positioned adjacent the machine, said rotation means including means for rotating the knife guiding means to different arcuate positions;
   (j) means, associated with the knife-guiding means, for moving the knife therealong transversely of the tread at a predetermined desired speed which is correlated to the rotation of the cam, the sensor coacting with the cam to cause correlated movement of the primary frame to and from the tire mounted adjacent the machine, whereby a groove is cut in the tread of the tire in accordance with the curved outer periphery of the cam.

2. The machine of claim 1, wherein the knife guiding means includes:
   (I) a pair of parallel guide rods;
   (II) a carriage slidably mounted on the guide rods;
   (III) means for detachably mounting the knife on the carriage.

3. The machine of claim 2, wherein the knife moving means, includes:
   (IV) a threaded drive screw disposed between the guide rods in fixed, parallel relation to the guide rods;
   (V) means on the carriage for threadably receiving the drive screw; and
   (VI) means for rotating the drive screw to cause movement of the carriage along the guide rods.

4. The machine of claim 3, wherein the knife is metal and U-shaped, and includes means for sensing the temperature of at least the tip of the knife in farthest spaced relation from the carriage.

5. The machine of claim 3, wherein the means for slidably mounting the primary and secondary frames on the main frame, includes a pair of parallel guide rails carried by the main frame.

6. The machine of claim 5, wherein the means for coupling the primary and secondary frames together, includes at least one hydraulic cylinder and reciprocating piston.

7. The machine of claim 6, which includes: means for mounting the main frame on a plurality of swivel casters so that it can be easily moved; and a plurality of locating pins mounted adjacent the casters and movable beyond the casters for receipt in stationary slots.

8. The machine of claim 6, which includes:
   (p) a beam rotatably mounted on the primary frame and supporting the guide rods along which the carriage moves;
   and wherein the means for mounting the knife guiding means for rotation includes;
   (I) a ring secured to the beam, the ring having an outer periphery with teeth projecting therefrom;
   (II) a wheel rotatably mounted on the primary frame in spaced relation from the ring, the wheel including a sprocket wheel keyed thereto;
   (III) a continuous drive chain linked around the sprocket wheel and outer toothed periphery of the ring;
   (IV) means for tensioning the drive chain; and
   (V) means coacting between the primary frame and ring for maintaining the ring in a desired arcuate position once the ring has been rotated to said position.

9. A machine used for grooving a tread of a tire, comprising:
   (a) a main frame for supporting other components of the machine;
   (b) a primary frame slidably mounted on the main frame;
   (c) a secondary frame slidably mounted on the main frame in spaced relation from the primary frame;

(d) means coupling the primary and secondary frames together for unitary movement and for movement relative to each other on the main frame;

(e) a cam rotatably mounted on the secondary frame, the cam having a curved outer periphery corresponding to the transverse curvature of the bottom of the groove desired to be cut in the tread of a tire;

(f) means, mounted on the primary frame, for monitoring the curved outer periphery of the cam as the cam rotates, said means including a sensor disposed adjacent the cam;

(g) a cutter, associated with the primary frame, for grooving the tread of a tire;

(h) means, coacting with the cutter, for guiding the cutter transversely of the tread of a tire positioned adjacent the machine;

(i) means, coacting with the primary frame, for mounting the cutter guiding means in a plane which is normal to the direction in which the cutter guiding means moves to and from a tire positioned adjacent the machine;

(j) means, associated with the cutter guiding means, for moving the cutter therealong transversely of the tread at a predetermined desired speed which is correlated to the rotation of the cam, the sensor coacting with the cam to cause correlated movement of the primary frame to and from the tire mounted adjacent the machine, whereby a groove is cut in the tread of the tire in accordance with the curved outer periphery of the cam.

10. A machine used for grooving a tread of a tire comprising:

(a) a main frame for supporting other components of the machine;

(b) a primary frame slidably mounted on the main frame;

(c) a secondary frame slidably mounted on the main frame in spaced relation from the primary frame;

(d) means coupling the primary and secondary frames together for unitary movement and for movement relative to each other on the main frame;

(e) a cutter, associated with the primary frame, for grooving the tread of a tire;

(f) means, coacting with the cutter, for guiding the cutter transversely of the tread of a tire positioned adjacent the machine;

(g) means, coacting with the primary frame, for mounting the cutter guiding means in a plane which is normal to the direction in which the cutter guiding means moves to and from a tire positioned adjacent the machine;

(h) means, associated with the cutter guiding means, for moving the cutter therealong transversely of the tread at a predetermined desired speed;

(i) a groove pattern, mounted on the secondary frame, coacting with the cutter moving means;

(j) means, mounted on the primary frame, coacting with the groove pattern for monitoring the pattern as it moves and causing correlated movement of the cutter guiding means relative to the tread to cut a groove therein in accordance with the pattern being monitored.

11. A machine used for grooving a tread of a tire, comprising:

(a) a support surface;

(b) a primary frame slidably mounted on the support surface;

(c) a secondary frame slidably mounted on the support surface in spaced relation from the primary frame;

(d) means coupling the primary and secondary frames together for unitary movement and for movement relative to each other on the support surface;

(e) a cutter, associated with the primary frame, for grooving the tread of a tire;

(f) means, coacting with the cutter, for guiding the cutter transversely of the tread of a tire positioned adjacent the machine;

(g) means, coacting with the primary frame, for mounting the cutter guiding means in a plane which is normal to the direction in which the cutter guiding means moves to and from a tire positioned adjacent the machine;

(h) means, associated with the cutter guiding means, for moving the cutter therealong transversely of the tread at a predetermined desired speed;

(i) a groove pattern, mounted on the secondary frame, coacting with the cutter moving means;

(j) means, mounted on the primary frame, coacting with the groove pattern for monitoring the pattern as it moves and causing correlated movement of the cutter guiding means relative to the tread to cut a groove therein in accordance with the pattern being monitored.

* * * * *